Dec. 9, 1952  D. C. DEAL  2,620,616
PEANUT HARVESTING MACHINE
Filed July 23, 1948  3 Sheets-Sheet 1

INVENTOR.
DANIEL C. DEAL,
BY
McMorrow, Berman
and Davidson
ATTORNEYS.

Dec. 9, 1952 D. C. DEAL 2,620,616
PEANUT HARVESTING MACHINE
Filed July 23, 1948 3 Sheets-Sheet 2

INVENTOR.
DANIEL C. DEAL,
BY
McMorrow, Berman & Davidson
ATTORNEYS.

Dec. 9, 1952 D. C. DEAL 2,620,616
PEANUT HARVESTING MACHINE
Filed July 23, 1948 3 Sheets-Sheet 3

INVENTOR.
DANIEL C. DEAL
BY
McMorrow, Berman & Davidson
ATTORNEYS.

Patented Dec. 9, 1952

2,620,616

UNITED STATES PATENT OFFICE 2,620,616

PEANUT HARVESTING MACHINE

Daniel C. Deal, Waycross, Ga.

Application July 23, 1948, Serial No. 40,359

2 Claims. (Cl. 56—351)

This invention relates to agricultural machines, and more particularly to a machine for harvesting peanuts.

A main object of the invention is to provide a novel and improved peanut harvesting machine which is simple in construction, easy to operate and which automatically plows up the peanut vines, shakes the vines free of dirt and deposits the vines laterally of the path of movement of the machine, where the vines are exposed for drying prior to final collection thereof.

A further object of the invention is to provide an improved peanut digging machine which greatly reduces the amount of human labor involved in harvesting peanuts, which is very rugged in construction, and which may be readily transported from place to place as required.

Further objects and advantages of the invention will become apparent from the following description and claims, and from the accompanying drawings, wherein:

Figure 6 is an enlarged fragmentary detail view in side elevation of the clutch lever and adjacent parts, as employed in the machine of Figure 1.

Figure 1:
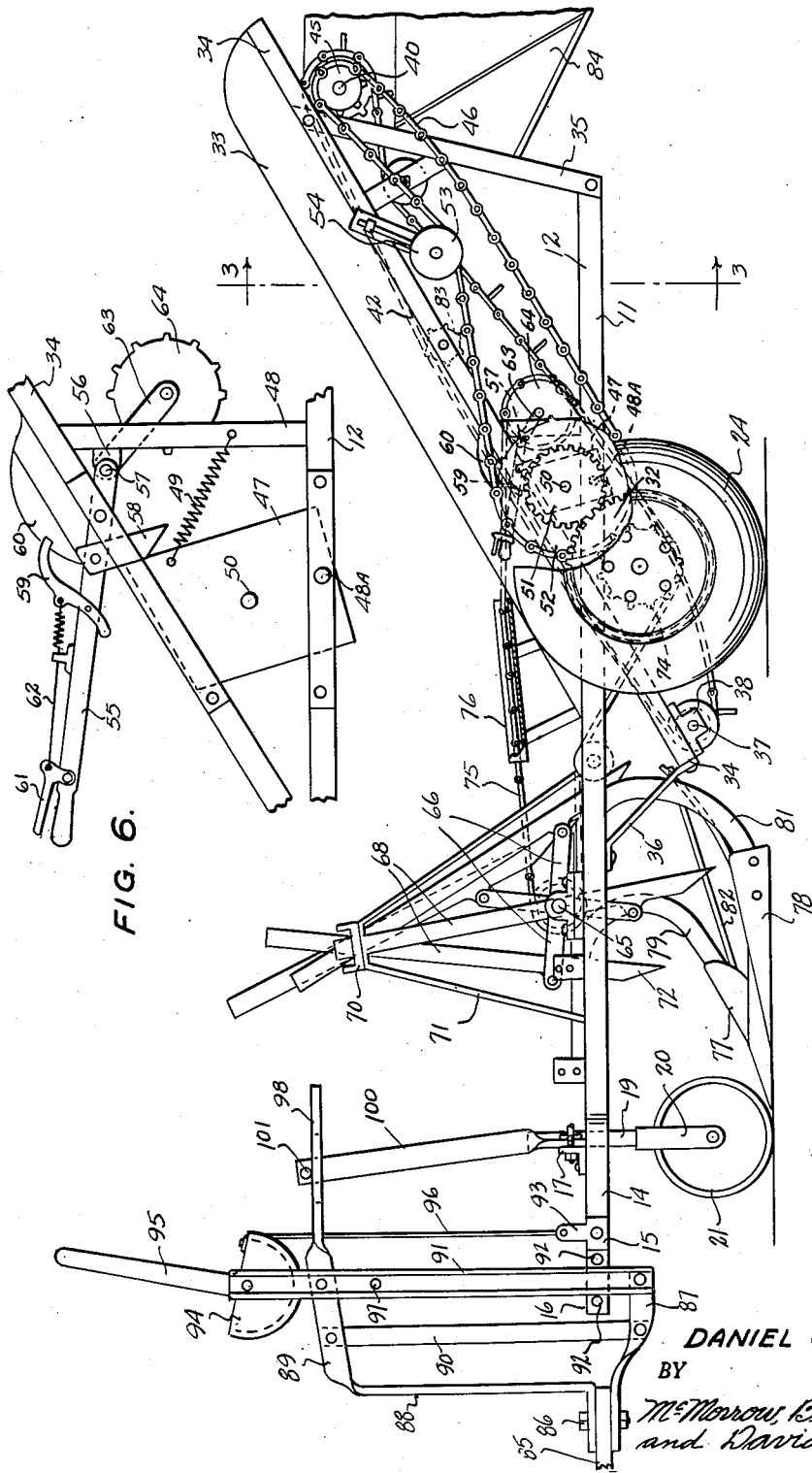
Figure 1 is a side elevational view of a peanut digging machine constructed in accordance with the present invention.

Referring to the drawings, 11 designates the frame of the machine, said frame comprising side bar members 12, 12 rigidly connected by suitable transverse bar members such as shown at 13. Frame 11 includes the convergent forward bar members 14, 14 which terminate in opposing parallel portions 15, 15 between which is secured the forwardly projecting hitch bar 16. Connecting the convergent bar members 14, 14 is a transverse bar member 17. Adjustably clamped to the intermediate portion of said bar member 17 by a U-bolt 18 is a vertical post member 19 having at its lower end spaced parallel vertical arms 20 between which is journalled the front wheel 21, which normally supports the front end of the machine on the ground. Journalled to the underside of the frame 11 adjacent the rear portion thereof by suitable bearing brackets is a drive shaft or transverse axle 22 on one end of which is rotatively mounted a first rear wheel 23. Designated at 24 is the second rear wheel. Wheel 24 is secured to the flange 25 of a hub member 26 rotatably mounted on axle 22. Hub member 26 includes an annular housing 27 provided with an inner wall member 28. Secured to shaft 22 within the housing 27 is a ratchet disc 29. Pivotally secured to wall member 28 is a pawl 30 biased into engagement with ratchet disc 29 by a leaf spring 31 secured to wall member 28. When the machine is moved forwardly, rotation of the ground-engaging rear wheel 24 is transmitted to axle 22 by the interlocking engagement of pawl 30 with the teeth of ratchet wheel 29. When the machine is moved rearwardly, the pawl 30 slips around the ratchet wheel 29 and wheel 24 rotates without transmitting torque to axle 22.

Secured to axle 22 adjacent the housing 27 is a first gear 32.

Figure 3:
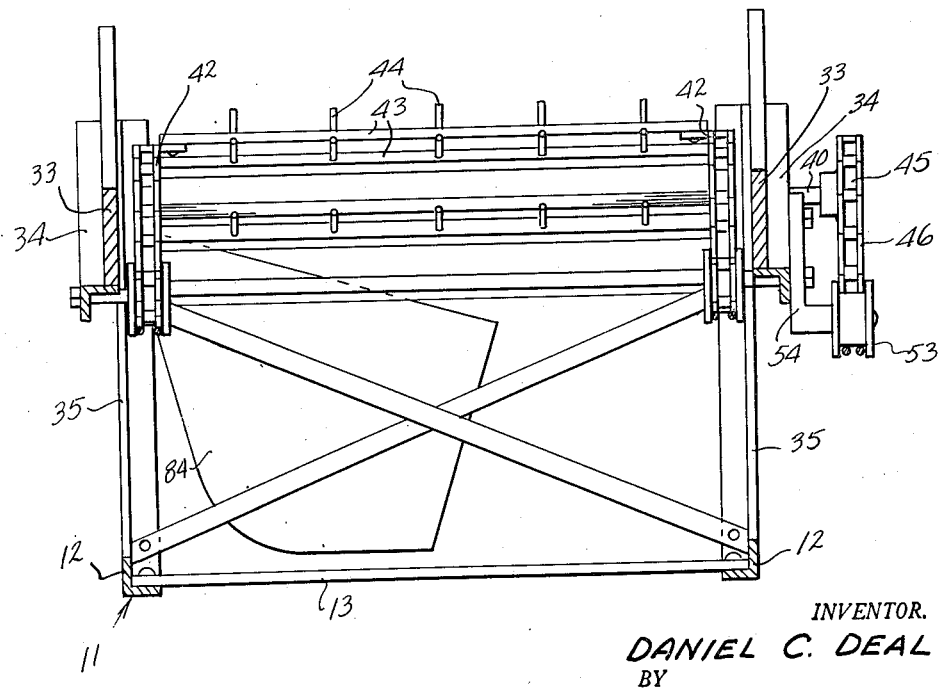
Figure 3 is a transverse vertical cross-sectional view taken on line 3—3 of Figure 1.

Rigidly secured to the rear ends of said bars 12, 12 are upwardly extending inclined angle bars 35, 35. Designated at 34, 34 are parallel rearwardly and upwardly inclined angle bars secured at their rear portions to the top ends of angle bars 35, 35 and connected by brackets 36 at their forward ends to the respective side bars 12, 12, said forward ends being positioned substantially below the plane of the frame 11. Secured to bars 34, 34 are upstanding side wall members 33, 33 defining a conveyor passage therebetween. Journalled to the forward ends of bars 34, 34 is a transverse shaft 37 carrying sprockets 38, 38. Journalled by suitable bearing brackets 39, 39 to the rear end portions of bars 34, 34 is a transverse shaft 40 carrying sprockets 41, 41 longitudinally aligned with the respective sprockets 38, 38. Engaged with the sprockets 38 and 41 at each side of the machine are respective sprocket chains 42, 42 connected by spaced transverse bar members 43, each bar member being provided with spaced spike elements 44. Shaft 40 is provided at its right end, as viewed in Figure 3, with a sprocket 45 on which is engaged an endless linked or sprocket chain 46 which drives shaft 40, as will be subsequently described. It is to be noted that the sprocket chains 42, 42 and the bar members 43 constitute an endless conveyor.

Referring now to Figure 6, 47 designates a vertical plate member which is pivotally connected at 40a to the side bar 12 at the right side of the frame 11. A vertical bar member 48 rigidly connects said side bar to the inclined angle bar 34 upwardly adjacent thereto. A spring 49 connects plate member 47 to bar member 48 and biases said plate member clockwise, as viewed in Figure 6. Rotatably mounted in plate member 47 is a short coupling transverse shaft 50 which carries at its outer end a second gear 51 which is movable into meshing engagement with gear 32. Shaft 50 also carries a sprocket 52 which is engaged by the sprocket chain 46. When gear 51 is in mesh with gear 32, sprocket chain 46 is therefore driven responsive to forward movement of the machine. The chain 46 is maintained taut by a weighted flanged roller 53 carried on an arm 54 pivoted to the adjacent angle bar 34.

Designated at 55 is a hand lever pivoted to a lug 56 carried by bar member 48. Fixed to the hand lever is a wedge bar 58 engageable with the rear edge of the plate member 47 to move said plate member counterclockwise, as viewed in Figure 6, responsive to clockwise movement of the lever 55 against the force of spring 49. When the hand lever 55 is elevated from the position shown in Figure 6, the wedge bar 58 releases plate member 47, whereby spring 49 moves the plate member clockwise and disengages gear 51 from gear 32. In the downwardly rotated position of plate member 47 shown in Figure 6 the gear 51 is in mesh with gear 32. Hand lever 55 is provided with a spring-biased pivoted locking dog 59 engageable with a notched plate 60 carried on the adjacent angle bar 34 to lock the lever 55 in the position shown in Figure 6. Also provided on lever 55 is a pivoted handle 61 connected to dog 59 by a cable 62 for manually disengaging the dog 59 from the notched plate 60.

The pivot member for lever 55 comprises a second transverse coupling shaft 57 extending to the opposite side of the machine. Shaft 57 is journalled in lug 56 and is rigidly secured to lever 55 adjacent said lug. At the opposite side of the machine, shaft 57 is journalled in a bracket 57a secured to the underside of the adjacent angle bar 34. Rigidly secured to the end of shaft 57 is a depending arm 63. Journalled to the end of arm 63 is a second sprocket 64.

Journalled to the forward portion of frame 11 is a transverse driven or crank shaft 65 provided with spaced opposing crank yokes 66. Journalled to each crank yoke at the crank bearing 67 thereof is an upstanding rake bar 68. The upper portions of the rake bars 68 pass slidably through spaced slots 69 formed in a transverse channel bar 70 secured by brackets 71 in a stationary elevated position above frame 11. The lower ends of the rake bars 68 are pointed, as shown at 72, and are located forwardly adjacent the end of the belt conveyor defined by the sprocket chains 42, 42 and the toothed transverse bars 43. The end of crank shaft 65 carries a sprocket 73 longitudinally aligned with sprocket 64. Also longitudinally aligned with said sprockets is a sprocket 74 secured to shaft 22 adjacent wheel 23. A second endless drive or sprocket chain 75 engages over sprockets 73 and 64, the upper run thereof being supported out of engagement with sprocket 74 by a channelled guide 76 rigidly secured to the frame 11. The lower run of chain 75 engages with sprocket 74 only when the chain is tightened. This occurs only when hand lever 55 is in the depressed position shown in Figure 6. When said hand lever is moved clockwise to a position wherein gears 51 and 32 are disengaged, arm 63 is rotated downwardly thereby moving sprocket 64 downwardly, which relaxes chain 75 so that its lower run drops out of mesh with the sprocket 74. In the gear-engaging position of hand lever 55 however, chain 75 meshes with sprocket 74, whereby the crank shaft 65 is driven by said chain.

Figures 2, 7:
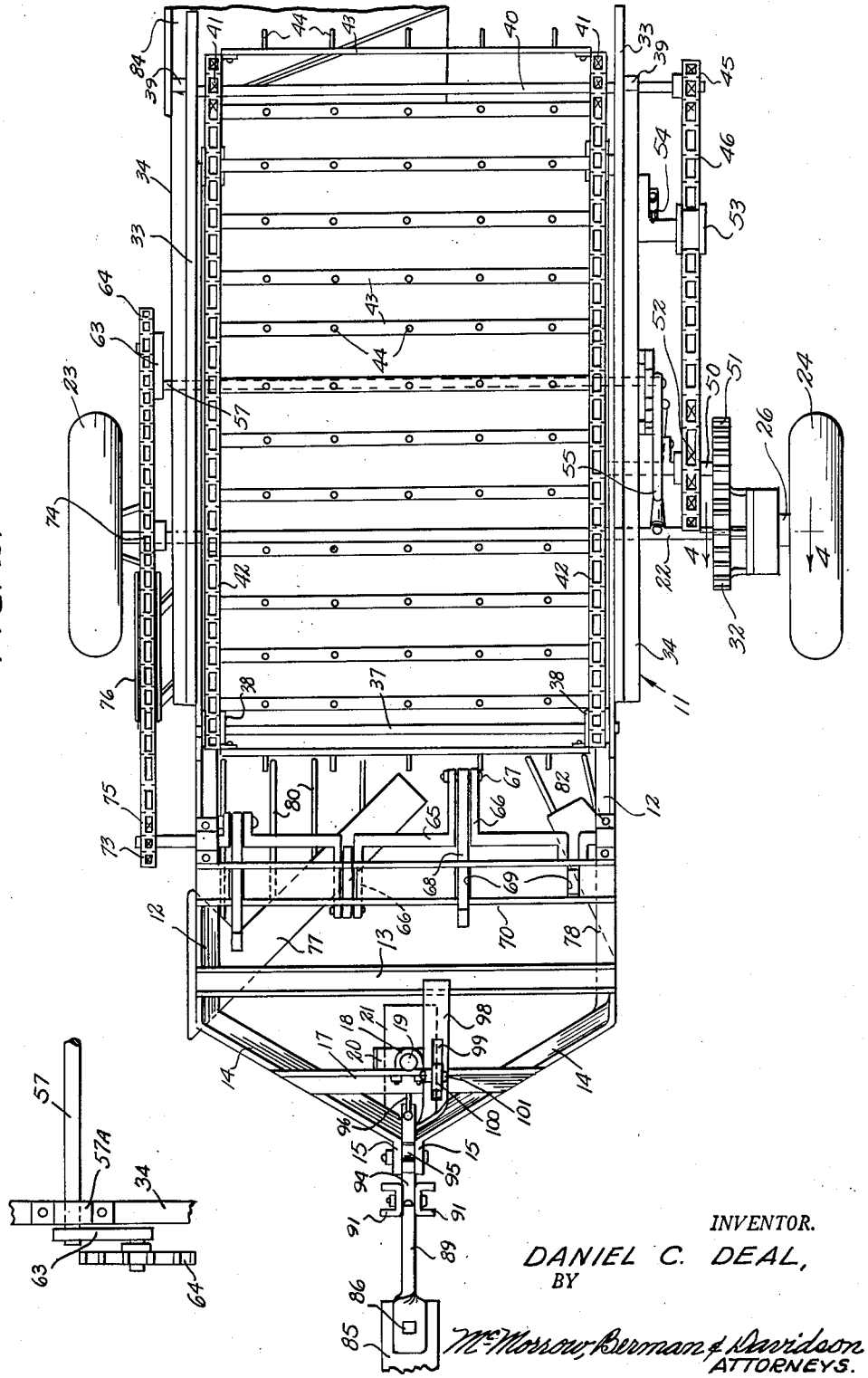
Figure 2 is a top plan view of the peanut digging machine of Figure 1.
Figure 7 is a fragmentary bottom detail view of the end of the clutch shaft and parts associated therewith, as employed in the machine of Figure 1.
Figure 4:
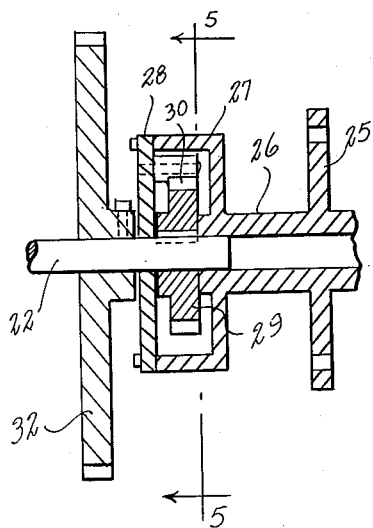
Figure 4 is an enlarged cross-sectional detail view taken on line 4—4 of Figure 2.
Figure 5:
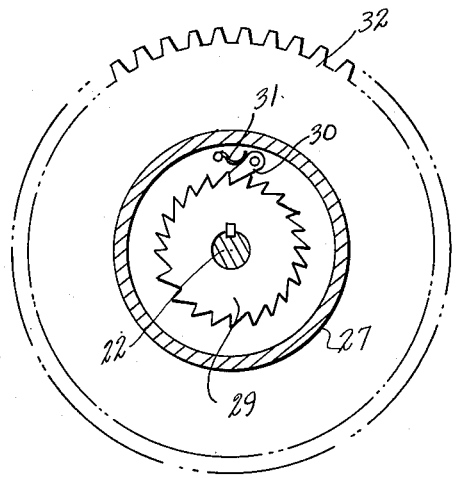
Figure 5 is a cross-sectional view taken on line 5—5 of Figure 4.

Secured to the forward end of frame 11 are the respective plow members 77 and 78, said plow members converging rearwardly, as shown in Figure 2. Plow member 77 comprises a relatively long plowshare element connected to frame 11 by a conventional beam 79 and being provided with spaced rearwardly and upwardly inclined rod elements 80 terminating adjacent the forward end of the belt conveyor defined by chains 42, 42 and transverse toothed bars 43. Plow member 78 comprises a relatively short plowshare element connected to frame 11 by a beam 81 and being also provided with rearwardly and upwardly inclined spaced rod members 82.

The chain members 42, 42 extend over a plurality of toothed vibrator sprockets 83 rotatively secured to the angle bars 34, 34, the teeth of the sprockets 83 being spaced differently from the link pins of the chains so that movement of the chains over said sprockets 83 produces vibration of the chains.

Secured to the rear end of frame 11 below the end of the belt conveyor defined by the chains 42, 42 and toothed bars 43 is a laterally directed sheet metal chute member 84 which receives the material from said conveyor and deflects it laterally, at the same time causing the material to turn over so that its roots will be exposed for drying when it is deposited on the ground.

In operation, the plow members 77 and 78 penetrate the soil as the machine is moved forward digging up the peanut vines. The crankshaft 65 oscillates the rake bars 68, the pointed tips 72 thereof engaging the vines and thrusting them rearwardly onto the spaced bars 80 and 82. The vines then are forced onto the chain belt conveyor and are engaged by the spikes 44 whereby said vines are moved upwardly on the conveyor. During the course of this upward and rearward movement the vines undergo a substantial amount of vibration, shaking all loose soil therefrom. When the vines reach the end of the conveyor they are deposited on the chute member 84 and deflected laterally onto the ground, being at the same time turned upwardly, for drying, as above described.

To uncouple the gears 32 and 51, hand lever 55 is moved upwardly from the position of Figure 6, allowing spring 49 to rotate plate member 47 clockwise. At the same time shaft 57 rotates arm 63 downwardly to slacken chain 75, so that said chain unmeshes from sprocket 74, terminating the rotation of crank shaft 65.

A conventional tractor may be employed to haul the machine. The end of the tractor drawbar is shown at 85. Secured to the drawbar by a bolt 86 is a hitch device comprising a bottom bracket bar 87 and an upper bracket bar 88 of substantial height terminating in a rearwardly extending arm 89. Arm 89 is connected to bottom bracket bar 87 by a vertical brace bar 90 and by a pair of opposing spaced vertical channel bars 91, 91. Hitch bar 16 of the harvesting machine extends between channel bars 91, 91 and is retained therein by transverse pins 92, 92 passing through bar 16 forwardly and rearwardly of the channel bars. Adjacent the rearward pin 92 an upstanding apertured lug 93 projects from hitch bar 16. Pivoted between the top ends of channel bars 91, 91 is a semi-circular pulley member 94 having a grooved periphery. A hand lever 95 projects upwardly from the top edge of pulley member 94. Connecting the right end of pulley member 94, as viewed in Figure 1, with the lug 93 is a cable 96. When lever 95 is rotated counterclockwise from the position shown in Figure 1, cable 96 is wound on pulley 94, raising the hitch bar 16, and thereby elevating the forward portion of the harvesting machine to an inoperative position. The channel bars 91, 91 are formed with registering apertures 97 through which a pin may be passed to support hitch bar 16 is an elevated position. This enables the machine to be hauled from place to place with the plow members 77 and 78 elevated sufficiently so as to avoid interference with the ground. When the machine is to be operated the retaining pin is removed from the apertures 97, whereby the forward position of the machine may be lowered to the ground.

As shown in Figure 2, arm 89 has a laterally offset rearward extension 98 formed with a slot 99. Projecting slidably through slot 99 is an upstanding guide bar 100 secured to transverse brace bar 17 and serving to maintain correct alignment of the machine with the tractor-carried hitch structure. A bolt 101 passing transversely through the top end of bar 100 limits downward movement of bar 100 with respect to extension 98.

While a specific embodiment of a peanut harvesting machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a peanut harvesting machine including a frame, a drive shaft on said frame, a driven shaft on said frame spaced from said drive shaft and adapted to carry rake elements, an endless conveyor arranged longitudinally of said frame contiguous to one end thereof and supported thereon, an endless linked drive chain positioned longitudinally of and operatively connected to said conveyor, a drive mechanism operatively connecting said drive chain and said driven shaft to said drive shaft, said mechanism comprising a first gear carried by said drive shaft, an upstanding plate member arranged on one side of said frame and connected to said frame for clockwise and counterclockwise movement, a spring operatively connected to said plate member for biasing the latter clockwise, a coupling shaft spaced from said drive shaft and rotatably journaled in said plate, a second gear on said coupling shaft and engageable with said first gear, a sprocket on said coupling shaft and engageable with said drive chain, a second coupling shaft spaced from said first coupling shaft and rotatably supported in said frame, a hand lever having one end connected to said second coupling shaft for rotation therein, a wedge bar fixed to said hand lever and engageable with said upstanding plate member to move the latter counterclockwise responsive to clockwise movement of said lever against the action of said spring and releasable from said upstanding plate member to move the latter clockwise responsive to counterclockwise movement of said lever under the action of said spring, a second endless drive chain positioned longitudinally of and on the other side of said frame and connected to said driven shaft, and a second sprocket carried by said second coupling shaft and movable into driving engagement with said second drive chain upon clockwise movement of said lever.

2. In a peanut harvesting machine including a frame, a drive shaft on said frame, a driven shaft on said frame spaced from said drive shaft and adapted to carry rake elements, an endless conveyor arranged longitudinally of said frame contiguous to one end thereof and supported thereon, an endless linked drive chain positioned longitudinally of and operatively connected to said conveyor, a drive mechanism operatively connecting said drive chain and said driven shaft to said drive shaft, said mechanism comprising a first gear carried by said drive shaft, an upstanding plate member arranged on one side of said frame and connected to said frame for clockwise and counterclockwise movement, a coupling shaft spaced from said drive shaft and rotatably journaled in said plate member, a second gear on said coupling shaft and engageable with said first gear, a sprocket on said coupling shaft and engageable with said drive chain, a second coupling shaft spaced from said first coupling shaft and rotatably supported in said frame, a hand lever having one end connected to said second coupling shaft for rotation therein, a wedge bar fixed to said hand lever and engageable with said upstanding plate member to move the latter counterclockwise responsive to clockwise movement of said lever against the action of said spring and releasable from said upstanding plate member to move the latter clockwise responsive to counterclockwise movement of said lever under the action of said spring, a second endless drive chain positioned longitudinally of and on the other side of said frame and connected to said driven shaft, a second sprocket carried by said second coupling shaft and movable into driving engagement with said second drive chain upon clockwise movement of said lever, and a hand actuable spring biased dog on said lever and engageable with a notched bar on said frame upon clockwise movement of said lever for locking the latter in its clockwise movement position.

DANIEL C. DEAL.

REFERENCES CITED

The following references are of record in the file of this patent:

UNITED STATES PATENTS

| Number | Name | Date |
| --- | --- | --- |
| 57,242 | Woodbridge | Aug. 14, 1866 |
| 320,687 | Price | June 23, 1885 |
| 451,329 | Larson | Apr. 28, 1891 |
| 669,908 | Williams | Mar. 12, 1901 |
| 743,489 | Green | Nov. 10, 1903 |
| 961,757 | Dain | June 21, 1910 |
| 1,131,419 | Rice | Mar. 9, 1915 |
| 1,162,137 | Clark | Nov. 30, 1915 |
| 1,321,326 | Percivall | Nov. 11, 1919 |
| 1,558,070 | Wirsching | Oct. 20, 1925 |

FOREIGN PATENTS

| Number | Country | Date |
| --- | --- | --- |
| 208,668 | Germany | Apr. 3, 1909 |